United States Patent [19]

Uranishi et al.

[11] Patent Number: 4,690,293
[45] Date of Patent: Sep. 1, 1987

[54] FILLER CAP STRUCTURE FOR A FUEL TANK

[75] Inventors: Kouji Uranishi, Susono; Takaaki Itoh, Mishima, both of Japan

[73] Assignee: Toyota Jidosha Kabushiki Kaisha, Toyota, Japan

[21] Appl. No.: 856,358

[22] Filed: Apr. 28, 1986

[30] Foreign Application Priority Data

Jul. 17, 1985 [JP] Japan ................................. 60-156126
Jul. 17, 1985 [JP] Japan ................................. 60-156127

[51] Int. Cl.⁴ ....................... B65B 31/00; B65D 41/04
[52] U.S. Cl. .................................. 220/86 R; 220/288; 220/304; 220/DIG. 33
[58] Field of Search ................. 220/86 R, 288, 304, 220/DIG. 33

[56] References Cited

U.S. PATENT DOCUMENTS

| | | | |
|---|---|---|---|
| 3,477,611 | 11/1969 | Niles | 220/86 R |
| 3,907,153 | 9/1975 | Matty | 220/86 R |
| 4,142,756 | 3/1979 | Henning | 220/86 R |
| 4,228,915 | 10/1980 | Hooper | 220/304 |
| 4,337,873 | 7/1982 | Johnson | 220/DIG. 33 |
| 4,494,673 | 1/1985 | Hiraishi | 220/DIG. 33 |

FOREIGN PATENT DOCUMENTS

| | | |
|---|---|---|
| 17491 | 5/1972 | Japan . |
| 18413 | 10/1974 | Japan . |
| 25488 | 7/1977 | Japan . |
| 102715 | 7/1979 | Japan . |
| 54-120089 | 9/1979 | Japan . |
| 166625 | 11/1979 | Japan . |
| 134324 | 9/1980 | Japan . |
| 57-92653 | 5/1982 | Japan . |
| 58-103746 | 7/1983 | Japan . |
| 87136 | 7/1986 | Japan . |

Primary Examiner—George E. Lowrance
Attorney, Agent, or Firm—Oblon, Fisher, Spivak, McClelland, & Maier

[57] ABSTRACT

A filler cap structure for a vehicular fuel tank particularly designed to prevent the discharge of fuel vapor to the ambient atmosphere and hence possible air pollution resulting therefrom upon filling of the fuel tank. The fuel tank has a filler tube closed by a filler cap. The filler tube is provided on its inner peripheral surface at a location inward of the bottom end of the filler cap with an annular seal seat. Defined by the annular seal seat, the inner peripheral surface of the fillter tube, and the bottom portion of the filler cap is an annular space which is connected through a communication tube with a canister. The annular space is sealed from the atmosphere by a first seal member disposed between the inner peripheral surface of the filler tube and the filler cap at a location outward of the annular space. The filler cap is provided on its bottom end with a second seal member which is adapted to be placed, upon complete closure of the filler cap against the filler tube, in sealing engagement with the annular seal seat on the inner peripheral surface of the filler tube for sealing of the fuel vapor in the fuel tank, the second seal member being moved away from the annular seal seat so as to place the fuel tank in communication with the canister when the filler cap is partially loosened.

6 Claims, 11 Drawing Figures

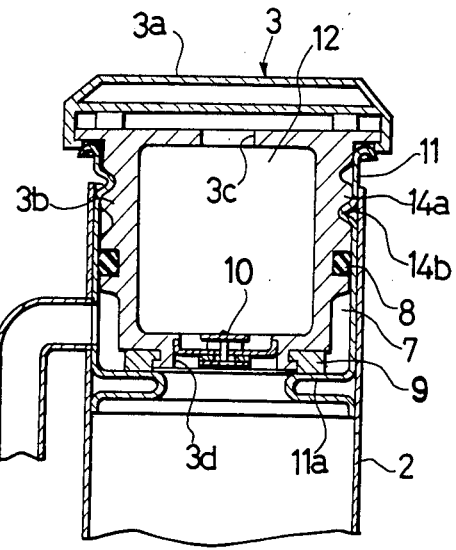
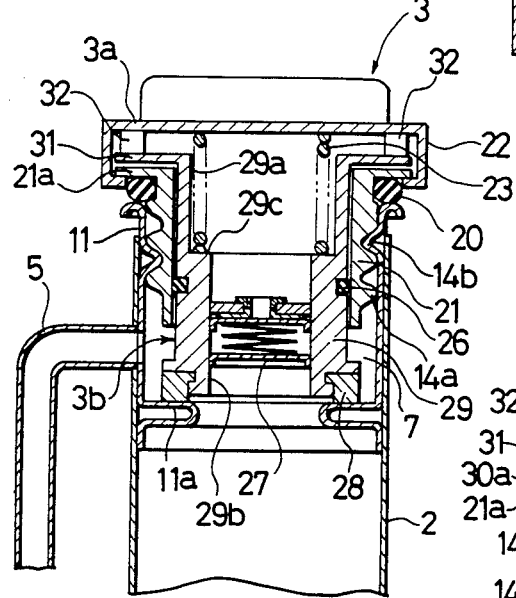
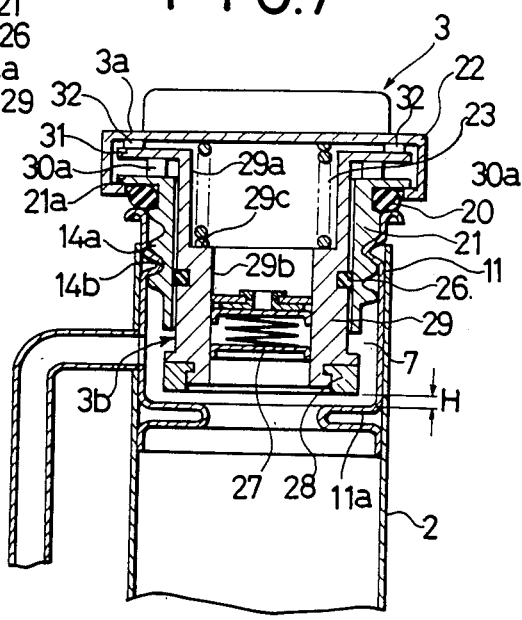

FILLER CAP STRUCTURE FOR A FUEL TANK

BACKGROUND OF THE INVENTION

1. Field of the Invention

This invention relates to a filler cap structure in which a filler cap is adapted to be fitted to a filler opening or filler tube of a fuel tank for a vehicle such as an automobile.

2. Description of the Prior Art

In general, a vehicle adapted to be driven by an internal combustion engine has a fuel tank for supplying fuel to the internal combustion engine, and when the fuel stored in the fuel tank is reduced below a certain level, a filler cap fitted to a filler opening of the fuel tank is removed so that a filler nozzle leading to a source of fuel is inserted into the filler opening for filling the fuel tank with fuel. Further, when the fuel stored in the fuel tank is consumed below a certain level, the space above the fuel in the fuel tank is filled with fuel vapor so that the fuel vapor thus accumulated is discharged, upon removal of the filler cap, to the ambient atmosphere so as to cause air pollution.

Japanese Utility Model Laid Open No. 92653/82 discloses a filler cap structure for an automotive fuel tank in which when the pressure in the fuel tank is reduced abnormally, atmospheric air is introduced through a vent hole in the filler cap into the fuel tank so as to raise the pressure therein until the pressure in the fuel tank becomes equal to the atmospheric pressure, while on the other hand, upon a pressure rise in the fuel tank as a result of an increase in temperature in the ambient air, the fuel vapor in the fuel tank is discharged through a vent valve to the atmosphere. However, such a discharge of fuel vapor to the atmosphere is a major cause of air pollution.

Japanese Utility Model Laid Open No. 103746/'83 teaches a filler cap structure for an automotive fuel tank which is provided with a pressure control valve for controlling the pressure in the fuel tank substantially at a constant level. In this case, however, air pollution cannot be avoided since pressure variations in the fuel tank resulting from fuel vaporization or consumption of the fuel stored therein are controlled by the discharge of the fuel vapor to the atmosphere or the introduction of atmospheric air into the fuel tank.

SUMMARY OF THE INVENTION

In view of the above, the object of present invention is to provide a novel and improved filler cap structure for a vehicular fuel tank of the character as described above in which, upon removal of the filler cap, the fuel vapor filled in the fuel tank is led to a separately arranged vapor-absorbing means for absorption thereof and thus prevented from being discharged to the atmosphere, thereby avoiding possible air pollution resulting therefrom.

In order to achieve the above object, according to one aspect of the present invention, there is provided a filler cap structure for a fuel tank which comprises:

a filler cap adapted to be fitted into a filler tube of a fuel tank;

an annular seal seat provided on the inner peripheral surface of the filler tube at a location inward of the bottom end of the filler cap, the annular seal seat being adapted to be placed in intimate abutting engagement with the bottom end of the filler cap;

an annular space defined by the annular seal seat, the inner peripheral surface of the filler tube, and the bottom portion of the filler cap;

a communication tube connected at one end with the filler tube and at the other end with a canister for communicating the annular space with the canister for absorption of the fuel vapor introduced into the latter from the fuel tank;

a first seal member disposed between the inner peripheral surface of the filler tube and the filler cap at a location outward of the annular space for sealing the fuel vapor from the ambient atmosphere; and a second seal member mounted on the bottom end of the filler cap and adapted to be placed, upon complete closure of the filler cap against the filler tube, in sealing engagement with the annular seal seat on the inner peripheral surface of the filler tube for sealing of the fuel vapor in the fuel tank, the second seal member being moved away from the annular seal seat so as to place the fuel tank in communication with the canister when the filler cap is partially loosened.

According to another aspect of the present invention, there is provided a filler cap structure for a fuel tank which comprises;

a filler cap adapted to be fitted into a filler tube of a fuel tank;

an annular seal seat provided on the inner peripheral surface of the filler tube at a location inward of the bottom end of the filler cap, the annular seal seat being adapted to be placed in intimate abutting engagement with the bottom end of the filler cap;

an annular space defined by the annular seal seat, the inner peripheral surface of the filler tube, and the bottom portion of the filler cap; and a communication tube connected at one end with the filler tube and at the other end with a canister for communicating the annular space with the canister for absorption of the fuel vapor introduced into the latter from the fuel tank;

wherein the fuel cap comprises a head, an outer cylindrical member and a control valve;

the head having means for holding together the control valve and the outer cylindrical member, and guide means for restricting the control valve for integral rotation therewith;

the outer cylindrical member having a cam surface along which the control valve slides in accordance with the rotation of the head, a first seal member mounted thereon for sealing between the outer cylindrical member and the outer end of the filler tube when the filler cap is fitted into the filler tube, and means for engaging the filler tube; and the control valve comprising an inner cylindrical member fitted in the outer cylindrical member for rotation and axial movement relative thereto, biasing means for biasing the inner cylindrical member toward the annular seal seat on the inner peripheral surface of the filler tube, a vacuum-operated valve adapted to allow the ambient air to be sucked into the fuel tank when the pressure in the fuel tank is reduced below a certain level, means for engaging the guide means of the head for rotation therewith, a second seal member mounted on the bottom end of the inner cylindrical member and adapted to be placed, upon complete closure of the filler cap against the filler tube, in sealing engagement with the annular seal seat on the inner peripheral surface of the filler tube for sealing of the fuel vapor in the fuel tank, the second seal member being located above the annular seal seat so as to place the fuel tank in communication with the canister when the filler cap is partially loosened, and a third seal member for providing a seal between the outer peripheral surface of the inner cylindrical member and the inner peripheral surface of the outer cylindrical member.

The above and other objects, features and advantages of the present invention will become more apparent from the following detailed description of a number of presently preferred embodiments of the invention when taken in conjunction with the accompanying drawings:

BRIEF DESCRIPTION OF THE DRAWINGS

FIG. 5 is a cross sectional view showing essential parts of a filler cap structure constructed in accordance with another embodiment of the present invention;

FIGS. 6, 7 and 8a through 8d show a filler cap structure constructed in accordance with a further embodiment of the present invention; in which FIG. 6 is a cross section similar to FIG. 2, showing that the filler cap is completely closed in a fluid tight manner;

FIG. 7 is a cross section similar to FIG. 3, showing that the filler cap is loosened with a control valve being raised under the action of a cam;

FIG. 8a through 8c are perspective views showing a cap head, a control valve and a threaded outer cylindrical portion of the filler cap, respectively; and FIG. 8d is a partially cutaway front elevational view showing the cap head, the control valve and the outer cylindrical portion assembled together.

DESCRIPTION OF THE PREFERRED EMBODIMENTS

Figure 1:
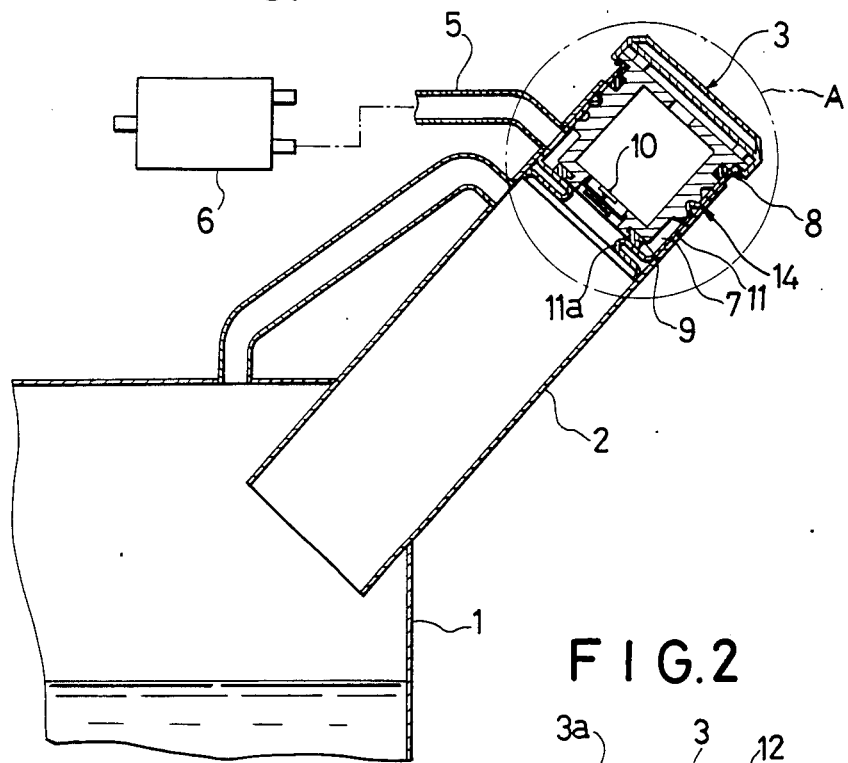
FIG. 1 is a cross sectional view showing the essential parts of a fuel tank with a filler cap structure constructed in accordance with a first embodiment of the present invention.

The invention will now be described in conjunction with preferred embodiments thereof by referring to the accompanying drawings. In the following description, the same or corresponding parts of the various filler cap structures shown in FIGS. 1 through 8d of the drawings are identified by the same reference numerals.

FIGS. 1 through 4 show a filler cap structure constructed in accordance with a first embodiment of the present invention. In FIG. 1 there is illustrated a vehicular fuel tank 1, which is provided at its top with a filler tube 2 which has one end thereof inserted into the hollow interior of the fuel tank 1 and the other end thereof extending outward therefrom. Threadedly fitted at 14 into the outer end of the filler tube 2 is a filler cap 3. Fitted into and fixedly secured to the inner peripheral surface of the outer end of the filler tube 2 is an annular insert 11 which has an inner of female thread 14b for engaging a male thread 14a and formed at its axially intermediate portion and an annular flange or an annular seal seat 11a formed at its inner end, the annular seal seat 11a being adapted to be in sealing engagement with the bottom or inner end of the filler cap 3 when the filler cap 3 is completely closed. A vent pipe 4 is connected at one end with the top surface of the fuel tank 1 and at the other end with that portion of the filler tube 2 which lies below or inward of the annular seal seat 11a of the annular insert 11 so that fuel and fuel vapor blown back upon filling of the fuel tank 1 can flow into the filler tube 2 through the vent pipe 4. When the filler cap 3 is fitted into the outer end of the filler tube 2, there will be an annular space 7 which is defined by the lower side wall of the threaded annular insert 11, the annular seal seat 11a and the lower end portion of the filler cap 3, the annular space 7 being in fluid communication with a canister 6 by way of a communication tube 5 so that fuel vapor is led from the annular space 7 into the canister 6 through the communication tube 5 and absorbed by the activated carbon contained in the canister 6.

Figure 2:
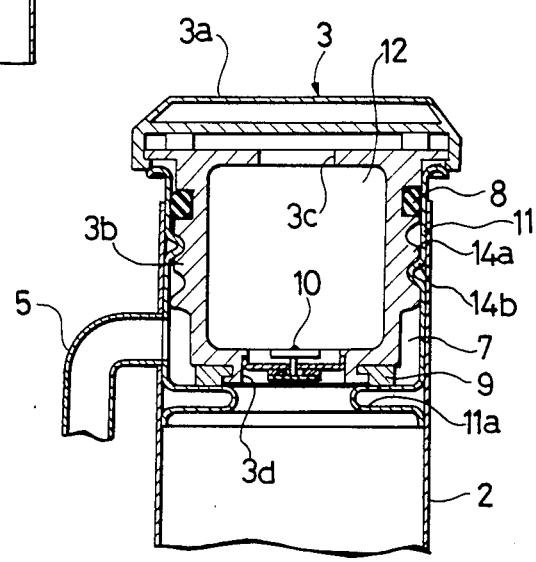
FIG. 2 is a cross sectional view, on an enlarged scale, of the filler cap structure of FIG. 1, showing the details thereof indicated by circle A.

FIG. 2 shows details of that portion of FIG. 1 which is indicated by circle A. As clearly shown in FIG. 2, the filler cap 3 has a head 3a and a plug member 3b connected therewith, the plug member 3b being formed on its annular side wall with the outer or male thread 14a which is adapted to be threadably engaged with the inner or female thread 14b on the annular insert 11 fitted into the outer end of the filler tube 2 so as to close or open the filler tube 2.

The plug member 3b has an air chamber 12 defined therein, the air chamber 12 being in fluid communication at its outer end with the ambient air via a through hole 3c formed in the top wall of the hollow plug member 3b, and at its inner end with the hollow interior of the filler tube 2 by way of an aperture 3d formed in the bottom wall of the hollow plug member 3b. Within the aperture 3d there is disposed a one way valve 10 for permitting the ambient air to be sucked into the fuel tank 1 passing through the through hole 3c, the air chamber 12 and the aperture 3d when the pressure in the fuel tank 1 decreases below a predetermined level, but preventing the reverse flow of air from the fuel tank 1 to the atmosphere. A first seal member 8 in the form of an O ring is mounted on the side wall of the plug member 3b at a location above or axially outside the outer thread 14a thereon so as to tightly seal the leakage of fuel vapor passing through a clearance between the side wall of the filler tube 2 and the annular side wall of the plug member 3b. Also, mounted on the bottom or inner end of the plug member 3b is an annular second seal member 9 of substantially rectangular cross section which is placed, upon complete closing of the filler cap 3, in abutting engagement with the annular seal seat 11a of the annular insert 11 so as to seal the flow of fuel vapor from the filler tube 2 to the communication tube 5 or vice versa.

Figure 3:
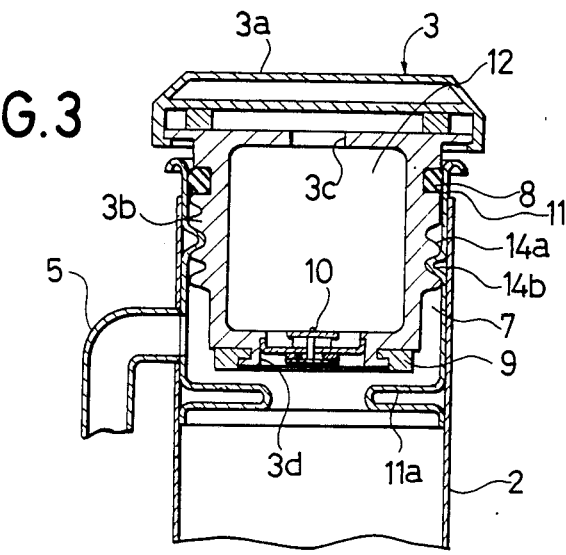
FIG. 3 is a cross sectional view similar to FIG. 2, but showing that the filler cap is loosened.
Figure 4:
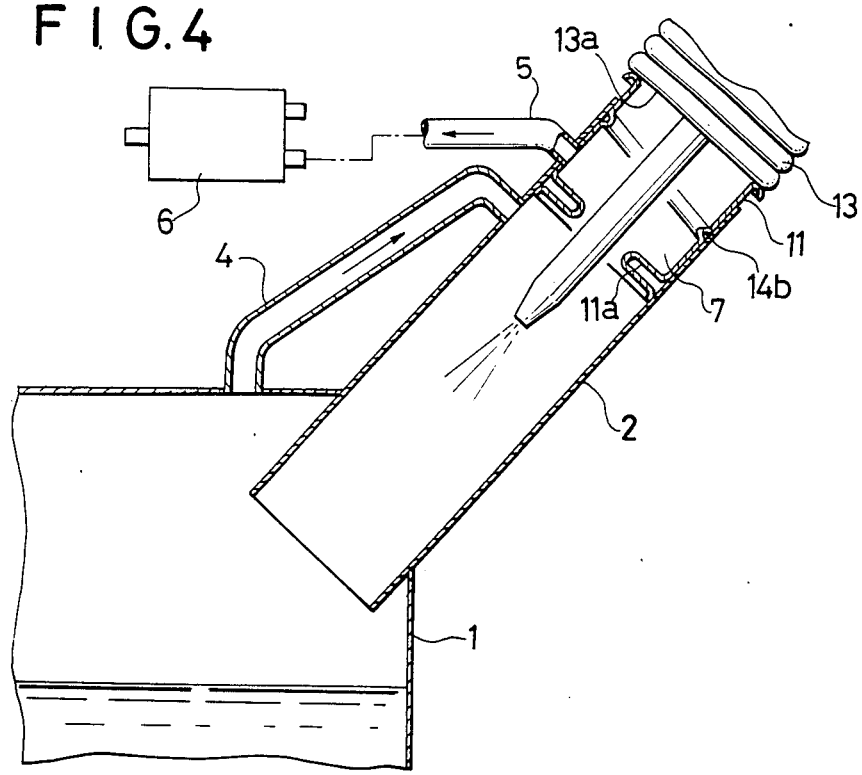
FIG. 4 is a cross sectional view showing that the fuel tank is being replenished with the filler cap removed.

In operation, when the fuel stored in the fuel tank 1 is consumed and reduced below a certain level and thus it becomes necessary to fill the fuel tank 1, the filler cap 3 is first loosened partially, as shown in FIG. 3, so that there is formed a clearance between the second seal member 9 on the bottom end of the plug member 3b and the annular seal seat 11a on the filler tube 2, thereby permitting the fuel vapor in the fuel tank 1 to flow into the communication tube 5 through the filler tube 2, the annular seal seat 9 and the annular space 7, and thence to the canister 6 wherein the fuel vapor is adsorbed by the activated carbon contained therein. As a result, the vapor pressure in the fuel tank 1 lowers to an appropriate level. Here, it is to be noted that during this operation, the sealing function of the O ring 8 continues so as to prevent the discharge of the fuel vapor from the fuel tank 1 to the outside. Subsequently, the filler cap 3 is removed and a filler nozzle 13 leading to a source of fuel is inserted into the thus opened outer end of the filler tube 2 for filling the fuel tank 1, as illustrated in FIG. 4. In this case, fuel vapor generated upon filling of fuel flows from the fuel tank 1 to the canister 6 by way of the vent pipe 4, the annular seal seat 11a, the annular space 7 and the communication tube 5, and is adsorbed therein by the activated carbon so that a stepped shoulder 13a of the filler nozzle 13, being in tight abutting engagement with the outer end of the filler tube 2, serves to effectively prevent the fuel vapor in the fuel tank 1 from being discharged to the ambient atmosphere. After finishing filling, the filler cap 3 is threaded into the outer end of the filler tube 2 so as to securely place the second seal member 9 on the bottom end of the plug member 3b in sealing engagement with the annular seal seat 11a on the filler tube 2.

On the other hand, in case the vapor pressure in the fuel tank 1 is raised in accordance with variations in temperature of the ambient atmosphere or under the action of the exhaust gas heat from an internal combustion engine, the fuel vapor in the fuel tank 1 is led to another canister (not shown) through a vent pipe having a valve mechanism (not shown) and adsorbed by the activated carbon contained therein. The vaporized fuel thus adsorbed in these canisters is purged so as to be supplied to the internal combustion engine at a predetermined operating range thereof during operation of a vehicle.

FIG. 5 shows another embodiment of a filler cap structure in accordance with the present invention. In this embodiment, an O ring 8 is mounted on the plug member 3b of the filler cap 3 at a location below or axially inside the outer or male thread 14a whereby upon removal of the fuel cap 3, the O ring 8 can perform its intended sealing function for a longer period of time than the O ring 8 of the above-mentioned first embodiment can.

FIGS. 6 through 8d show a further embodiment of a filler cap structure in accordance with the present invention.

In this embodiment, as pictured in FIG. 6, a filler tube 2 has an annular insert 11 fitted into and secured to the outer end thereof, the annular insert 11 being formed at its lower or inner end with an annular seal seat 11a and at its annular side wall with an inner or female thread 14b adapted to be in threaded engagement with an outer or male thread 14a of a filler cap 3. The filler cap 3 comprises a head 3a and a plug member 3b connected with the head 3a, the plug member 3b being composed of an outer cylindrical member 21 having the outer thread 14a and an inner cylindrical member 29 slidably fitted in the outer cylindrical member 21. The outer cylindrical member 21 is integrally formed at its upper or outer end with a radially outwardly extending annular flange 21a which is in abutting engagement with and thus held by an radially inwardly extending annular flange 22 of the cap head 3a. Mounted on the annular side wall of the outer cylindrical member 21 at a location adjacent its flanged outer end 21a is a first seal member 20 in the form of an O ring which is adapted to be clamped between the annular flange 21a and the outer end of the filler tube 2 so as to make a seal therebetween when the filler cap 3 is fitted into the outer end of the filler tube 2. An annular second seal member 28 of substantially rectangular cross section is mounted on the bottom end of the inner cylindrical member or control valve 29 so that it is adapted to be placed in sealing engagement with the annular seal seat 11a on the filler tube 2 for sealing of the fuel vapor in the fuel tank 1 when the filler cap 3 is completely closed. A third seal member 26 in the form of an O ring is mounted on the side wall of the inner cylindrical member 29 so as to make a seal between the outer peripheral surface of the inner cylindrical member 29 and the inner peripheral surface of the outer cylindrical member 21. Thus the annular space 7 is positively sealed from the ambient air by the first and third seal members 20 and 26.

The inner cylindrical member 29 has a stepped axial bore including a larger inside-diameter portion 29a and a smaller inside-diameter portion 29b with an annular shoulder 29c formed therebetween. Disposed within the inner cylindrical member 29 at its larger inside-diameter portion 29a is a biasing means 23 such as a coiled compression spring which is arranged under compression between the cap head 3a and the annular shoulder 29c on the inner peripheral surface of the inner cylindrical member 29 for biasing the latter in a direction to bring the bottom or inner end of the inner cylindrical member 29 into sealing engagement with the annular seal seat 11a. Disposed in the smaller inside-diameter portion 29b of the inner cylindrical member 29 is a one-way valve 27 in the form of a vacuum-operated valve which serves to permit the outside air to enter the fuel tank 1 when the pressure in the fuel tank 1 is lowered below a certain level, but to prevent the discharge of the fuel vapor to the atmosphere.

Figure 8A:
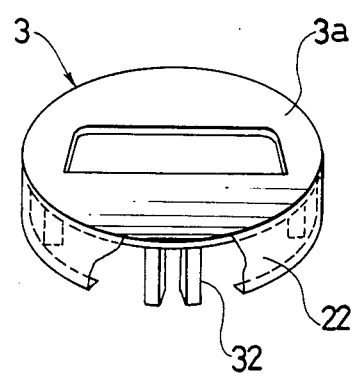
Figure 8B:
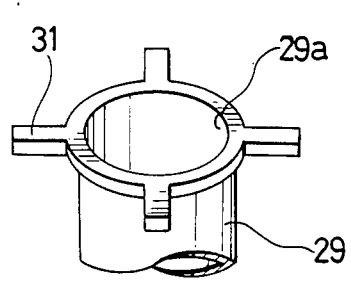
Figure 8C:
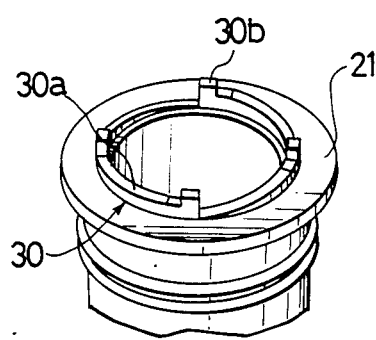
Figure 8D:
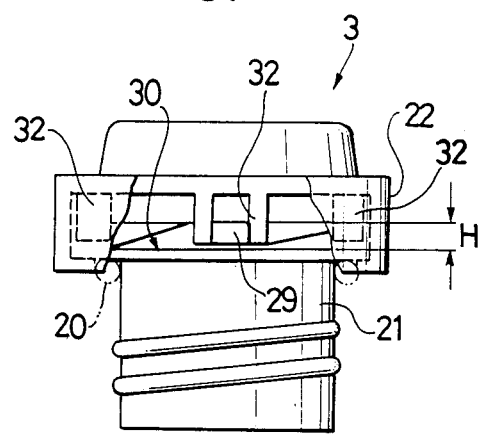

The detailed structure of the rotary sliding portion of the filler cap 3 with reference to FIGS. 8a through 8d will now be described. As clearly shown in FIG. 8a, the head 3a of the filler cap 3 has four guide means 32 arranged in circumferentially spaced-apart relation at equal intervals, each of the guide means 32 comprising a pair of parallel projections extending radially inward from the annular side wall of the cap head 3a. As seen in FIG. 8b, the inner cylindrical member 29 is integrally formed at its upper or outer end with four projections 31 extending radially outward therefrom and being arranged in circumferentially spaced-apart relation at equal intervals, the projections 31 being adapted to be in fitting engagement with the corresponding pairs of parallel-arranged guide projections 32 for sliding movement therealong. The outer cylindrical member 21 is integrally formed at its upper or outer flanged end 21a with four cam formations 30, as depicted in FIG. 8c, which are disposed on the inner peripheral edge of the flanged end thereof at equal circumferential intervals, each of the cam formations 30 having a gradually rising cam surface 30a with a height difference H (see FIG. 8d) between its lowermost end and its uppermost end, on which surface 30a is rested the corresponding one of the engagement projections or cam followers 31 of the inner cylindrical member 29, and an axially extending stopper projection 30b formed at the raised end of the cam surface 30a. The head 3a, the outer cylindrical member 21 and the inner cylindrical member 29 are assembled together, as shown in FIG. 8d, in such a manner that, upon turning of the head 3a relative to the outer cylindrical member 21, the inner cylindrical member 29, being engaged at its cam projections 31 with the paired guide projections 32 of the head 3a, is caused to rotate together with the head 3a whereby the cam projections 31 of the inner cylindrical member 29 are forced to move along the cam surfaces 30a on the outer cylindrical member 21, thus resulting in an axial displacement of the inner cylindrical member 29 relative to the outer cylindrical member 21.

Here it is assumed that filling of the fuel tank 1 becomes necessary owing to a shortage of the fuel stored therein. In this case, by turning of the head 3a of the filler cap 3 in its loosening direction, the inner cylindrical member or control valve 29, being engaged at its cam projections 31 with the guide projections 32 of the cap head 3a for rotation therewith, is initially caused to turn through an angle of 90 degrees from the FIG. 6 position to the FIG. 7 position with its cam projections 31 being slidingly moved along the cam surfaces 30a of the outer cylindrical member 21 from its lowermost end to its uppermost end which is higher by a certain distance H than the lowermost end. In this state, as seen in FIG. 7, there will be formed a clearance of the distance H between the second seal member 28 on the bottom or inner end of the inner cylindrical member 29 and the annular seal seat 11a on the filler tube 2 so that the fuel vapor in the fuel tank 1 flows through the clearance, the annular space 7 and the communication tube 5 into the canister 6 and is adsorbed by the activated carbon contained therein. During the above operation, the outer cylindrical member 21 remains stationary with its outer or male thread 14a being in firm threaded engagement with the inner or female thread 14b of the filler tube 2 so that the first and third seal members 20 and 26 effectively seal the fuel vapor flowing from the fuel tank 1 toward the ambient atmosphere. Subsequently, when the cap head 3a is turned in the loosening direction of the filler cap 3, the cam projections 31 of the inner cylindrical member 29 is brought into abutment with the stopper projections 30b at the uppermost ends of the cam surfaces 30a of the outer cylindrical member 21 whereby the outer cylindrical member 21 and hence the filler cap 3 as a whole are forced to turn in the loosening direction thereof. As a result, the first seal member 20 does not function, but by that time, the vapor pressure in the fuel tank 1 has been lowered sufficiently and hence there will be no pollution of the ambient air.

It will be readily appreciated that after removal of the filler cap 3, filling of the fuel tank 1 can be made by inserting the filler nozzle 13 into the filler tube 2 in the same manner as described above with reference to FIG. 4. When the fuel tank 1 has been filled with fuel, the filler nozzle 13 is removed from the filler tube 2 and the filler cap 3 is then fitted into the outer end of the filler tube 2 and turned in its tightening direction with the outer thread 14a of the outer cylindrical member 21 being placed in tight threaded engagement with the inner thread 14b of the filler tube 2. As the filler cap is being tightened in this manner, the cam projections 31 of the inner cylindrical member or control valve 31 is caused to move along the cam surface 30a of the outer cylindrical member 21 from its uppermost end to its lowermost end so that the second seal member 28 on the bottom or inner end of the inner cylindrical member 29 is brought into intimate sealing contact with the annular seal seat 11a and, at the same time, the first seal member 20 mounted on the outer cylindrical member 21 is clamped between the annular flanged end 21a thereof and the outer end of the filler tube 2 so as to make a seal therebetween.

In the event that the pressure in the fuel tank 1 is excessively reduced below a certain level determined by the set load of the vacuum-operated valve 27 during the time when the filler cap 3 is fitted into the filler tube 2 in a fluid-tight manner, the valve 27 is caused to open under the action of atmospheric pressure so that air is permitted to be sucked into the fuel tank 1. On the other hand, should the vapor pressure in the fuel tank 1 increase excessively so as to overcome the biasing force of the biasing spring 23, the spring 23 is thereby compressed so that the inner cylindrical member 29 is forced to move outwardly relative to the outer cylindrical member 21 against the biasing force of the spring 23, as a consequence of which there is formed a clearance between the second seal member 28 on the bottom of the inner cylindrical member 29 and the annular seal seat 11a, the dimension of the clearance or the distance between the second seal member 28 and the annular seal seat 11a being proportional to the difference in pressure between the fuel vapor in the fuel tank 1 and the ambient atmosphere. Accordingly, the fuel vapor in the fuel tank 1 flows through the clearance between the second seal member 28 and the annular seal seat 11a into the annular space 7 between the side wall of the filler tube 2 and the outer peripheral surface of the plug member 3b of the filler cap 3, and thence into the canister 6 via a communication tube 5, thereby reducing the pressure in the fuel tank 1. When the difference between the fuel tank pressure and the atmospheric pressure is reduced to fall within a prescribed range, i.e. when the pressure in the fuel tank 1 drops to a certain level which is determined by the set load of the biasing spring 23, the inner cylindrical member 29 is forced to move inward under the action of the biasing spring 23 against the vapor pressure in the fuel tank 1 so that the second seal member 28 is placed in abutting engagement with the annular seal seat 11a to close off the clearance therebetween.

As described above, the filler cap structure for a fuel tank of the present invention comprises a filler cap adapted to be fitted into a filler tube of a fuel tank; an annular seal seat provided on the inner peripheral surface of the filler tube at a location inward of the bottom end of the filler cap; a communication tube connected with the filler tube for communicating an annular space, defined by the annular seal seat, the inner peripheral surface of the filler tube and the bottom portion of the filler cap, with a canister which serves to absorb the fuel vapor introduced therein from the fuel tank; a first seal means disposed between the filler tube and the filler cap at a location outward of the annular space for sealing the annular space from the ambient atmosphere; and a second seal means mounted on the bottom end of the filler cap and adapted to be placed, upon complete closure of the filler cap, in sealing engagement with the annular seal seat, the second seal member being moved away from the annular seal seat so as to place the fuel tank in communication with the canister when the filler cap is partially loosened. With this construction, there are provided the following advantages: when the filler cap is partially loosened upon filling of the fuel tank, the fuel vapor in the fuel tank is introduced into the canister via a clearance formed between the seal member on the bottom end of the filler cap and the annular seal seat as well as the communication tube, and is adsorbed by activated carbon contained therein so that the vapor pressure in the fuel tank is thereby reduced to an appropriate level by the time the filler cap is removed from the filler tube, thus preventing the discharge of the fuel vapor into the ambient atmosphere and hence pollution of air resulting therefrom in an effective manner.

While a few preferred embodiments of the present invention have been shown and described, it will be clearly understood to those skilled in the art that various changes and modifications may be made therein without departing from the spirit and scope of the invention as defined in the claims.

What is claimed is:

1. A filler cap structure for a fuel tank, comprising:
a filler cap having a plug member with upper and lower end and adapted to be fitted into a filler tube of a fuel tank;
an annular seal member provided on the inner peripheral surface of the filler tube at a location inward of the bottom end of the filler cap, the annular seat member including a seal seat adapted to be placed in intimate abutting engagement with the bottom end of the filler cap;
an annular space defined by the annular seal member, the inner peripheral surface of the filler tube, and the bottom portion of the filler cap;
a communication tube connected at its one end with the filler tube and at its other end with a canister for communicating the annular space with the canister for absorption of the fuel vapor introduced into the latter from the fuel tank;
a first annular seal member mounted on said upper end of said plug member disposed between an upper inner peripheral surface of the filler tube and the filler cap at a location outward of the annular space for sealing the fuel vapor from the ambient atmosphere; and
a second annular seal member mounted on said bottom end of said plug member and adapted to be placed, upon complete closure of the filler cap against the filler tube, in sealing engagement with the annular seal seat on the inner peripheral surface of the filler tube for sealing of the fuel vapor in the fuel tank, the first annular seal member engaging an upper portion of said annular seal member second seal member being disengaged from the annular seal seat so as to place the fuel tank in communication with the canister when the filler cap is partially loosened.

2. A filler, cap structure for a fuel tank as set forth in claim 1, wherein the first seal member comprises an O ring, and wherein the second seal member comprises an annular seal ring of substantially rectangular cross section.

3. A filler cap structure for a fuel tank comprising:
a filler cap adapted to be fitted into a filler tube of a fuel tank;
an annular seal seat provided on the inner peripheral surface of the filler tube at a location inward of the bottom end of the filler cap, the annular seal seat being adapted to be placed in intimate abutting engagement with the bottom end of the filler cap;
an annular space defined by the annular seal seat, the inner peripheral surface of the filler tube, and the bottom portion of the filler cap; and
a communication tube connected at its one end with the filler tube and at its other end with a canister for communicating the annular space with the canister for absorption of the fuel vapor introduced into the latter from the fuel tank;
wherein the fuel cap comprises a head, an outer cylindrical member and a control valve;
the head having means for holding together the control valve and the outer cylindrical member, and guide means for restricting the control valve for integral rotation therewith;
the outer cylindrical member having a cam surface along which the control valve slides in accordance with the rotation of the head, a first seal member mounted thereon for sealing between the outer cylindrical member and the outer end of the filler tube when the filler cap is fitted into the filler tube, and means for engaging the filler tube; and
the control valve comprising an inner cylindrical member fitted in the outer cylindrical member for rotation and axial movement relative thereto, a biasing means for biasing the inner cylindrical member toward the annular seal seat on the inner peripheral surface of the filler tube, a vacuum-operated valve adapted to allow the ambient air to be sucked into the fuel tank when the pressure in the fuel tank is reduced below a certain level, means engaging the guide means of the head for rotation therewith, a second seal member mounted on the bottom end of the inner cylindrical member and adapted to be placed, upon complete closure of the filler cap against the filler tube, in sealing engagement with the annular seal seat on the inner peripheral surface of the filler tube for sealing of the fuel vapor in the fuel tank, the second seal member being moved away from the annular seal seat so as to place the fuel tank in communication with the canister when the filler cap is partially loosened, and a third seal member for sealing between the outer peripheral surface of the inner cylindrical member and the inner peripheral surface of the outer cylindrical member.

4. A filler cap structure for a fuel tank as set forth in claim 3, wherein both the first seal member and the third seal member comprise an O ring, and wherein the second seal member comprises an annular seal ring of substantially rectangular cross section.

5. A filler cap structure for a fuel tank as set forth in claim 3, wherein the filler cap is provided on its outer peripheral surface with an outer thread, and wherein the filler tube is provided on its inner peripheral surface with an inner thread.

6. A filler cap structure for a fuel tank as set forth in claim 1, wherein the filler cap is provided on its outer peripheral surface with an outer thread, and wherein the filler tube is provided on its inner peripheral surface with an inner thread.

* * * * *